United States Patent
Liang et al.

(10) Patent No.: US 9,855,617 B2
(45) Date of Patent: Jan. 2, 2018

(54) HIGH-PRECISION ZINC-BASED ALLOY ELECTRODE WIRE AND MANUFACTURE METHOD THEREOF

(71) Applicant: Ningbo Powerway Materialise Co., Ltd., Ningbo (CN)

(72) Inventors: Zhining Liang, Ningbo (CN); Fanglin Guo, Ningbo (CN); Linhui Wan, Ningbo (CN); Tong Wu, Ningbo (CN)

(73) Assignee: Ningbo Powerway Materialise Co., Ltd., Ningbo (CN)

( * ) Notice: Subject to any disclaimer, the term of this patent is extended or adjusted under 35 U.S.C. 154(b) by 189 days.

(21) Appl. No.: 14/772,639

(22) PCT Filed: Apr. 21, 2015

(86) PCT No.: PCT/CN2015/000279
§ 371 (c)(1),
(2) Date: Sep. 3, 2015

(87) PCT Pub. No.: WO2016/023326
PCT Pub. Date: Feb. 18, 2016

(65) Prior Publication Data
US 2016/0368070 A1    Dec. 22, 2016

(30) Foreign Application Priority Data

Aug. 13, 2014 (CN) .......................... 2014 1 0398470

(51) Int. Cl.
*B23H 7/24* (2006.01)
*C22C 1/02* (2006.01)
(Continued)

(52) U.S. Cl.
CPC ................. *B23H 7/24* (2013.01); *B21C 1/02* (2013.01); *B21C 23/08* (2013.01); *B22D 21/005* (2013.01);
(Continued)

(58) Field of Classification Search
CPC .. B21C 23/08; B21C 1/02; B23H 7/08; B23H 7/24; C22C 18/02; C22C 1/02;
(Continued)

(56) References Cited

U.S. PATENT DOCUMENTS 7,723,635 B2 * 5/2010 Shin .................. B23H 7/08
219/69.11

FOREIGN PATENT DOCUMENTS

CN            102528190        *   7/2012

\* cited by examiner

*Primary Examiner* — Camie S Thompson
(74) *Attorney, Agent, or Firm* — Wang Law Firm, Inc.

(57) ABSTRACT

The invention discloses a high-precision zinc-based alloy electrode wire, the external shell thereof consisting of: Zn: 70.5-95%; Cu: 2.5-27%; X: 0.02-4.0%; Y: 0.002-0.4%, and unavoidable impurities; where, X refers to any two kinds of metals selected from Ni, Ag, Cr, Si and Zr, and the weight percentage of each of these two kinds of metals is 0.01-2.0%; and Y refers to any two kinds of metals selected from Ti, Al, Co, B, and P, and the weight percentage of each of these two kinds of metals is 0.001-0.2%; the ε-phase in a metallurgical structure of the external shell is above 80 wt %. The invention also provides a method for manufacturing the electrode wire, which has high surface smoothness of the cut metal workpieces to improve the cutting precision. The method has simple process, high maneuverability, less steps, so as to facilitate large-scale and automated production.

14 Claims, 4 Drawing Sheets

(51) Int. Cl.
*B22D 21/00* (2006.01)
*C22F 1/08* (2006.01)
*C23G 1/10* (2006.01)
*C22C 18/02* (2006.01)
*B21C 1/02* (2006.01)
*B21C 23/08* (2006.01)
*B22D 25/02* (2006.01)
*B23H 7/08* (2006.01)
*C22C 9/04* (2006.01)
*C22F 1/16* (2006.01)
*C23G 1/24* (2006.01)
*C25D 3/22* (2006.01)
*C25D 5/34* (2006.01)
*C25D 5/50* (2006.01)
*C25D 7/06* (2006.01)

(52) U.S. Cl.
CPC .............. *B22D 25/02* (2013.01); *B23H 7/08* (2013.01); *C22C 1/02* (2013.01); *C22C 9/04* (2013.01); *C22C 18/02* (2013.01); *C22F 1/08* (2013.01); *C22F 1/165* (2013.01); *C23G 1/103* (2013.01); *C23G 1/24* (2013.01); *C25D 3/22* (2013.01); *C25D 5/34* (2013.01); *C25D 5/50* (2013.01); *C25D 7/0607* (2013.01)

(58) Field of Classification Search
CPC .......... C22C 9/04; C25D 7/0607; C25D 5/50;
C25D 5/34; C25D 3/22; C23G 1/103;
C23G 1/24; B22D 21/005; C22F 1/08
USPC ................ 428/398, 371, 375, 385, 386, 387
See application file for complete search history.

HIGH-PRECISION ZINC-BASED ALLOY ELECTRODE WIRE AND MANUFACTURE METHOD THEREOF

RELATE APPLICATIONS

This application is a national phase entrance of and claims benefit to PCT Application for a windows wiper, PCT/CN2015/000279, filed on Apr. 21, 2015, which claims benefit to Chinese Patent Application 201410398470.8, filed on Aug. 13, 2014. The specifications of both applications are incorporated here by this reference.

FIELD OF THE INVENTION

The present invention relates to the technical field of high-precision electrical spark wire cutting machining, in particular to a high-precision zinc-based alloy electrode wire and a manufacturing method thereof.

DESCRIPTION OF THE PRIOR ART

In recent years, with the need for machining micro parts, for example, special complex parts such as micro gears, micro splines and micro connectors, high-precision electrical spark wire cutting machining, due to its unique machining process, i.e., non-mechanical-contact machining, is particularly adaptive to requirements of manufacturing micro machines and is cost effective. Hence, it plays an important role in the production field of many micro machines, and develops rapidly. Continuously exploring the high-precision electrical spark wire cutting machining technique in China and abroad has achieved a great progress in an aspect of combination of the high-precision electrical spark wire cutting machining with manufacturing of micro machines and an aspect of practical application thereof.

There are many factors that will influence the high-precision electrical spark wire cutting machining, for example, the precision of a machine tool, the performance of an electrode wire, the pulse power supply, the wiring system, the control system and the process planning, all of which will directly influence the machining precision and the quality of surface of micro parts. Hence, the key for the realization of the high-precision electrical spark wire cutting machining for micro and complex parts is to study the performance of the electrode wire and the cutting machining technique, in order to meet the requirements of the high-precision electrical spark wire cutting machining to a maximum extent. An electrode wire in the prior art generally has one or more layers of cores, the outermost layer is mostly an external shell constituted of copper in significant $\alpha$-phase, zinc alloy in $\eta$-phase, or crystalline Cu—Zn alloy in these two phases. The metallurgical structure of the shell is generally in $(\alpha$-$\beta)$-phase, $\beta$-phase, $\gamma$-phase or $(\beta$-$\gamma)$-phase. At present, there are various kinds of commercially available electrode wires, such as red copper electrode wires, also known as high-copper electrode wires. Such electrode wires have a metallurgical structure single in $\alpha$-phase, good toughness, and very excellent electrical conductivity, and are capable of withstanding a maximum instantaneous high-pulse current and a large cutting current. However, such electrode wires generally have a low tensile strength. The tensile strength of a rigid wire is approximately 400 MPa to 500 MPa in average. As a result, such electrode wires are only suitable for special machining of special machine tools. As another example, brass electrode wires exist. The brass electrode wires, as the most common commercially available electrode wire, have a crystalline structure in $(\alpha$-$\beta)$-phase. Such electrode wires may show varying strengths of stretching by a series of stretching and thermal treatment processes so as to satisfy different equipment and application occasions, and the strength of stretching may reach above 1000 MPa. However, problems, such as, much copper powder on the surface of such electrode wires and large geometric error of the cross-section thereof, all result in the deterioration of discharge stability, thus heavily influencing the machining precision and the quality of surface of workpieces, and meanwhile, polluting components of the equipment and consequently increasing the loss of the equipment. As a further example, galvanized electrode wires exist. The core of such galvanized electrode wires is common brass. During preparation thereof, a layer of zinc is electroplated onto the surface to form an external shell with a metallurgical structure in significant $\eta$-phase. The gasification of zinc during cutting contributes to improvement of the flushing performance during surface cutting, so that the cut surfaces are smoother than ordinary brass wires. However, in practice, powder on such electrode wires is still likely to fall down to hinder further improvement of the machining precision. As a yet further example, coated electrode wires exit. The core of the electrode wires is mainly brass, red copper or other material, the metallurgical structure of the skin layer thereof is in $\beta$-phase, $\gamma$-phase, or $(\beta$-$\gamma)$-phase. Such electrode wires significantly improve the production efficiency, and meanwhile improve the cutting precision and the quality of the surface to some extent. However, although applicable to machining industries, such as, manufacturing of molds, complex parts like aircraft parts and medical parts, and large-thickness and large-size parts, such electrode wires are not optimized in the machining precision of cutting some micro and complex parts to the largest extent. Especially with the development and mature application of micro machines, such electrode wires can not meet requirements on the machining precision any more.

The reason why the electrode wires with an external shell in $\beta$-phase, $\gamma$-phase or $\beta$+$\gamma$)-phase, can improve the cutting efficiency is that, they can improve the discharge energy of electrical spark to result in, during the electrical discharge, large explosive power and large and sharp ablation quantity, which are more advantageous for corrosion of metal material. Hence, the cutting efficiency of such electrode wires is significantly improved when compared to that of ordinary electrode wires. However, due to large electrical discharge energy and large explosive power, during cutting, of such electrode wires, pits on the surface of the cut material are large. This is not disadvantageous for improvement of the cutting precision and the surface smoothness. The galvanized electrode wires in significant $\eta$-phase discharge gently during cutting and have a low amount of corrosion and small pits on the surface of the cut material, all of which are advantageous for improvement of the cutting precision. However, since the surface of such electrode wires is substantially pure zinc having a low melting point, the vaporization enthalpy is small, the heat taken away by the rapid gasification is small, and the effect of effective flushing is poor. As a result, the produced metal particles will block gaps easily, if not removed in time, to cause defects. Hence, a large amount of working solution is to be injected during cutting for secondary flushing, in order to avoid wire breaking resulted from thermal accumulation. However, in case of improper flushing or unstable application of the working solution, the machining precision will be influenced. High requirements are also proposed on the flushing system of the machine tool.

SUMMARY OF THE INVENTION

It is a first object of the present invention to provide, a high-precision zinc-based alloy electrode wire having high cutting precision and high surface smoothness of cut material.

It is a second object of the present invention to provide, a method for manufacturing the high-precision zinc-based alloy electrode wire described above.

For achieving the first object, a high-precision zinc-based alloy electrode wire, comprising:
 a core, and an external shell covering the core;
 wherein
 the core is made of brass, the external shell is made from a material, which composition in weight percentage (wt %) consisting of:
 Zn: 70.5-95%; Cu: 2.5-27%; X: 0.02-4.0%; Y: 0.002-0.4%; and unavoidable impurities, and the unavoidable impurities is less than or equal to 0.3%;
 where, X refers to any two kinds of metals selected from Ni, Ag, Cr, Si and Zr, and the weight percentage of each of these two kinds of metals is 0.01-2.0%; and Y refers to any two kinds of metals selected from Ti, Al, Co, B, and P, and the weight percentage of each of these two kinds of metals is 0.001-0.2%;
 the external shell has a thickness of 2-4 um, the weight percentage of $\epsilon$-phase in a metallurgical structure of the external shell is above 80 wt %, and a remainder component of the external shell is either $\gamma$-phase or $\eta$-phase; and the $\epsilon$-phase is uniformly distributed on a surface of the core.

Preferably, for achieving the first object, another high-precision zinc-based alloy electrode wire comprising: a core, and an external shell covering the core;
 wherein the core is made of brass,
 the external shell in wt % consisting of:
 Zn: 78.5-85%; Cu: 12.5-19%; X: 0.02-4.0%; Y: 0.002-0.4%; and unavoidable impurities, and the unavoidable impurities is less than or equal to 0.3%;
 where, X refers to any two kinds of metals selected from Ni, Ag, Cr, Si and Zr, and the weight percentage of each of these two kinds of metals is 0.01-2.0%; and Y refers to any two kinds of metals selected from Ti, Al, Co, B, and P, and the weight percentage of each of these two kinds of metals is 0.001-0.2%;
 the external shell has a thickness of 2-4 um, the external shell has a metallurgical structure in $\epsilon$-phase, and the $\epsilon$-phase is uniformly distributed on a surface of the core.

For achieving the second object, a method for manufacturing a high-precision zinc-based alloy electrode wire, comprising following steps:
 1) mixing alloy in proportion by mixing, in weight percentage (wt %): 57-68% Cu, 0.03-4.5% X, 0.004-0.5% Y; and the balance is Zn and unavoidable impurities originated from raw material or introduced during smelting, and the unavoidable impurities is less than or equal to 0.5%; where, X refers to any two kinds of metals selected from Ni, Ag, Cr, Si, and Zr, and each of these two kinds of metals is 0.015-2.25%; and Y refers to any two kinds of metals selected from Ti, Al, Co, B, and P, and each of these two kinds of metals is 0.002-0.25%;
 2) smelting mixed alloy in an induction furnace, and casting smelted mixed alloy into an alloy wire blank with a diameter of 8-15 mm;
 3) obtaining a based wire blank with a diameter of 0.5-5 mm by extruding or multi-stage stretching and annealing the alloy wire blank;
 4) degreasing the based wire blank, washing the based wire blank with acids, washing the based wire blank with water, then galvanizing the based wire blank, with an electroplating current of 1500-3000 A and a voltage of 150-220 V, to obtain an electroplated first wire blank with a galvanized layer having a thickness of 0.5-50 um;
 5) stretching and annealing the electroplated first wire blank to obtain a second wire blank; and
 6) alloying thermal treating the second wire blank to obtain a finished electrode wire with a diameter of 0.05-0.35 mm.

Preferably, in Step 5, the stretching is done with a speed of 500-2000 m/min, the annealing is done with a voltage between 10-100 V and a current between 10-50 A. It makes the zinc atoms in the galvanized layer to diffusively migrate toward the based wire blank easily to form a new crystalline structure, which is benefit for the subsequent thermal treatment.

Preferably, in Step 6, the thermal treatment is carried out at 50-230 degrees C. for 3-30 hrs. It is benefit for formation of the shell with $\epsilon$-phase structure in the finished product.

Compared with the prior art, the electrode wire and the manufacturing method of the present invention have following advantages:

(1) Compared with the ordinary coated electrode wires, the electrode wire in the present invention can provide sufficient positive and negative electrons quickly during cutting, discharge gently during cutting, and thus maintain effective cutting. Meanwhile, the external shell has a certain Cu—Zn alloy layer which increases the temperature of gasification and thus facilitates the dissipation of heat. As a result, the flushing effect is improved and it is helpful to improve the precision of the cutting machining and to obtain excellent quality of surface.

(2) The additional components of X and Y into the electrode wire of the present invention will increase the dislocation of Cu—Zn alloy atoms during the stretching of the alloy wire blank when manufacturing, it will result in large distortion of lattices at the grain boundary and the energy will be increased. Accordingly, during the thermal treatment the zinc atoms in $\eta$-phase of the external shell are likely to diffusively transfer toward the core (($\alpha$+$\beta$)-phase), it will benefit for the formation of the $\epsilon$-phase structure in the external shell; the electrode wire having the external shell with a metallurgical structure in $\epsilon$-phase (above 80 wt %) has excellent toughness, and can effectively resist shake of the electrode wire, which is resulted from the current and the flushing force during the cutting, thus to prevent the electrode wire from being fractured due to inadequate toughness. Meanwhile, due to a relatively high melting point, such electrode wire can withstand an instantaneous high-pulse current and a large cutting current, and can have short instantaneous discharge gaps, high surface smoothness of the cut metal workpieces, and excellent quality of surface. As a result, the cutting precision is effectively improved. Such electrode wire is especially applicable to finishing and multiple cutting for more than three times. Meanwhile, the additional components of X and Y can decrease the temperature of the thermal treatment and shorten the time required by the thermal treatment, so that the machining efficiency is improved.

(3) The method for manufacturing a high-precision zinc-based alloy electrode wire in the present invention is benefit for formation of $\epsilon$-phase in the external shell of the finished electrode wire and avoidance of the further diffusion of crystal to form a $\gamma$-phase or the like. Furthermore, the method has simple process, high maneuverability, less steps and simple production equipment, and it is easy to manufacture qualified products, so as to facilitate large-scale and automated production.

DETAILED DESCRIPTION OF THE PREFERRED EMBODIMENT

To enable a further understanding of the innovative and technological content of the invention herein refer to the detailed description of the invention and the accompanying drawings below:

Embodiment 1

Figure 1:
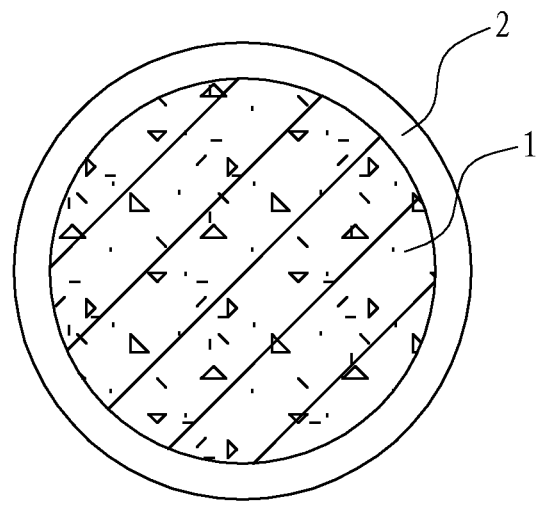
FIG. 1 is a sectional view of a second wire blank according to Embodiment 1 of the present invention.
Figure 2:
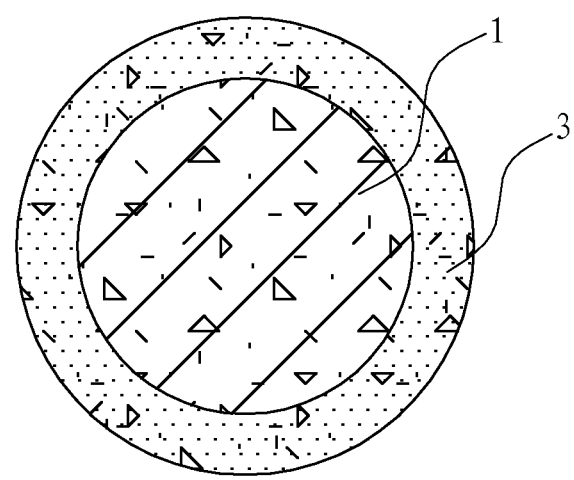
FIG. 2 is a sectional view of a finished electrode wire according to Embodiment 1 of the present invention.

A method for manufacturing a high-precision zinc-based alloy electrode wire, comprises following steps: mixing alloy in proportion by mixing following materials in weight percentage (wt %): 65% Cu, 2.0% Ni, 1.2% Si, 0.12% Ti and 0.2% Co; and the balance is Zn and unavoidable impurities originated from raw material or introduced during smelting, and the unavoidable impurities is less than or equal to 0.5%; smelting above mixed alloy in an induction furnace, and casting smelted mixed alloy into an alloy wire blank with a diameter of 9 mm; then, obtaining a based wire blank with a diameter of 0.5 mm by extruding or multi-stage stretching and annealing the alloy wire blank; then, degreasing the based wire blank, washing the based wire blank with acids, washing the based wire blank with water, then galvanizing the based wire blank, with an electroplating current of 2000 A and a voltage of 200 V, to obtain an electroplated first wire blank with a galvanized layer having a thickness of 0.5 um; next, stretching and annealing the electroplated first wire blank to obtain a second wire blank, which includes a core 1 and a galvanized layer 2, as shown in FIG. 1, where the stretching is done with a speed of 600 m/min, the annealing is done with a voltage of 20 V and a current of 15 A; alloying thermal treating the second wire blank to obtain a finished electrode wire with a diameter of 0.10 mm and having an external shell 3 with a thickness of 2 um, as shown in FIG. 1 and FIG. 2, the thermal treatment is carried out at 172° C. for 11 hrs. During the thermal treatment, the core 1 and the galvanized layer 2 diffuse, and the diameter of the core 1 is decreased while the thickness of the galvanized layer 2 is increased finally forming the stable external shell 3. Finally, the finished product obtained after the thermal treatment is wound onto shafts with different types.

Figure 3:
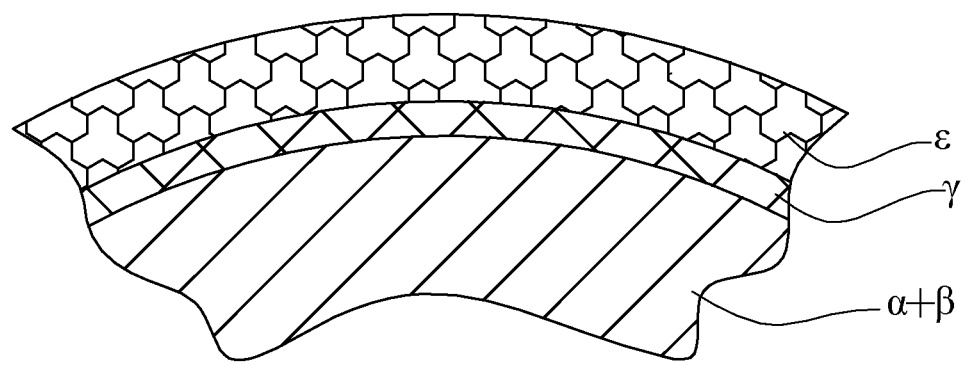
FIG. 3 to FIG. 5 are views showing a metallurgical structure of a finished electrode wire according to Embodiments 1 to 3.

The composition of the external shell 3 of the finished electrode wire in weight percentage (wt %) consists of: 70.5% Zn, 27% Cu, 1.5% Ni, 0.6% Si, 0.1% Ti, 0.1% Co and 0.2% impurities. In this embodiment, the material of the mixed alloy has the additional Ni, Si, Ti and Co, it will increase the dislocation of Cu—Zn alloy atoms during the stretching of the alloy wire blank when manufacturing, it will result in large distortion of lattices at the grain boundary and the energy will be increased. Accordingly, during the thermal treatment the zinc atoms in η-phase of the external shell 3 are likely to diffusively transfer toward the core 1 (($\alpha+\beta$)-phase), it will benefit for the formation of the ϵ-phase structure in the external shell 3. During the thermal treatment, the atoms transfer between the external shell 3 and the core 1, accordingly, the defects resulted from the stretching such as atomic dislocation and vacancies are gradually reduced, and the dislocation density is decreased too, the activation energy of diffusion is decreased. In the meanwhile, the melting point of the external shell 3 in ϵ-phase structure is gradually increased compared to that of the external shell of original pure zinc (the galvanized layer 2) in η-phase, and the bonding force among the atoms is strengthened. Furthermore, it is easy to form a ϵ-phase structure in the external shell under the thermal treatment of this embodiment. As shown in FIG. 3, the core 1 in the finished electrode wire is in ($\alpha+\beta$)-phase, the ϵ-phase in the metallurgical structure of the external shell 3 is 86 wt % and is uniformly distributed on the surface of the core 1, and the remaining in the metallurgical structure of the external shell 3 is in γ-phase.

The elongation rate of the finished electrode wire is tested by a universal electronic stretcher, and the melting point of the shell thereof is tested by a differential thermal analyzer. Using the high-precision zinc-based alloy electrode wire according to this embodiment, the manufacturing precision and the cutting speed of the electrical spark wire cutting machining are tested, material SKD61 as an object material. All the test result data is shown in Table 1.

Embodiment 2

A method for manufacturing a high-precision zinc-based alloy electrode wire, comprises following steps: mixing alloy in proportion by mixing following materials in weight percentage (wt %): 66% Cu, 1.5% Cr, 1.5% Zr, 0.15% P and 0.06% B; and the balance is Zn and unavoidable impurities originated from raw material or introduced during smelting, and the unavoidable impurities is less than or equal to 0.3%; smelting above mixed alloy in an induction furnace, and casting smelted mixed alloy into an alloy wire blank with a diameter of 8 mm; then, obtaining a based wire blank with a diameter of 3 mm by extruding or multi-stage stretching and annealing the alloy wire blank; then, degreasing the based wire blank, washing the based wire blank with acids, washing the based wire blank with water, then galvanizing the based wire blank, with an electroplating current of 1500 A and a voltage of 200 V, to obtain an electroplated first wire blank with a galvanized layer having a thickness of 40 um; next, stretching and annealing the electroplated first wire blank to obtain a second wire blank, the stretching is done with a speed of 500 m/min, the annealing is done with a voltage of 80 V and a current of 50 A; alloying thermal treating the second wire blank to obtain a finished electrode wire with a diameter of 0.10 mm and having an external shell 3 with a thickness of 4 um, the thermal treatment is carried out at 121° C. for 23 hrs. Finally, the finished product obtained after the thermal treatment is wound onto shafts with different types.

Figure 4:
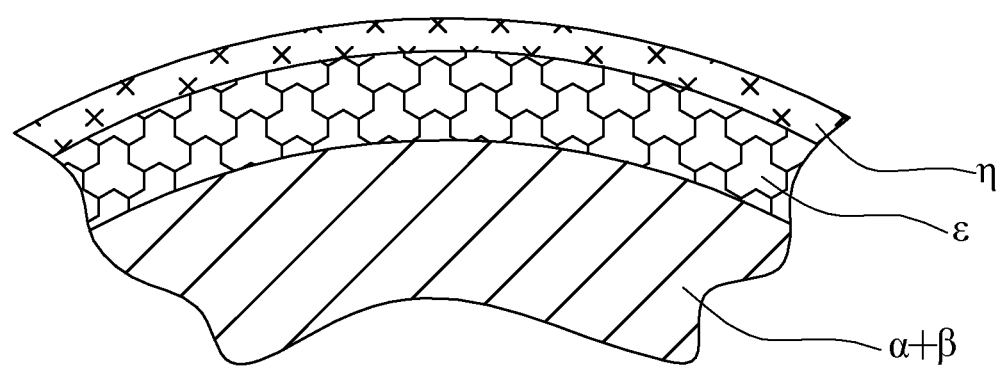

The composition of the external shell 3 of the finished electrode wire in weight percentage (wt %) consists of: 95% Zn, 2.5% Cu, 1.0% Cr, 1.1% Zr, 0.1% P, 0.03% B and 0.27% impurities. In this embodiment, the material of the mixed alloy has the additional Cr, Zr, P and B, it will increase the dislocation of Cu—Zn alloy atoms during the stretching of the alloy wire blank when manufacturing, it will result in large distortion of lattices at the grain boundary and the energy will be increased. Accordingly, during the thermal treatment the zinc atoms in η-phase of the external shell 3 are likely to diffusively transfer toward the core 1 ((α+β)-phase), it will benefit for the formation of the ε-phase structure in the external shell 3. During the thermal treatment, the atoms transfer between the external shell 3 and the core 1, accordingly, the defects resulted from the stretching such as atomic dislocation and vacancies are gradually reduced, and the dislocation density is decreased too, the activation energy of diffusion is decreased. In the meanwhile, the melting point of the external shell 3 in ε-phase structure is gradually increased compared to that of the external shell of original pure zinc (the galvanized layer 2) in η-phase, and the bonding force among the atoms is strengthened. Furthermore, it is easy to form a ε-phase structure in the external shell under the thermal treatment of this embodiment. As shown in FIG. 4, the core 1 in the finished electrode wire is in (α+β)-phase, the ε-phase in the metallurgical structure of the external shell 3 reaches 92 wt % and is uniformly distributed on the surface of the core 1, and the remaining in the metallurgical structure of the external shell 3 is in η-phase.

The elongation rate of the finished electrode wire is tested by a universal electronic stretcher, and the melting point of the shell thereof is tested by a differential thermal analyzer. Using the high-precision zinc-based alloy electrode wire according to this embodiment, the manufacturing precision and the cutting speed of the electrical spark wire cutting machining are tested, material SKD61 as an object material. All the test result data is shown in Table 1.

Embodiment 3

A method for manufacturing a high-precision zinc-based alloy electrode wire, comprises following steps: mixing alloy in proportion by mixing following materials in weight percentage (wt %): 60% Cu, 0.12% Si, 0.07% Ag, 0.18% Ti, 0.02% B; and the balance is Zn and unavoidable impurities originated from raw material or introduced during smelting, and the unavoidable impurities is less than or equal to 0.3%; smelting above mixed alloy in an induction furnace, and casting smelted mixed alloy into an alloy wire blank with a diameter of 10 mm; then, obtaining a based wire blank with a diameter of 4 mm by extruding or multi-stage stretching and annealing the alloy wire blank; then, degreasing the based wire blank, washing the based wire blank with acids, washing the based wire blank with water, then galvanizing the based wire blank, with an electroplating current of 2500 A and a voltage of 150 V, to obtain an electroplated first wire blank with a galvanized layer having a thickness of 40 um; next, stretching and annealing the electroplated first wire blank to obtain a second wire blank, the stretching is done with a speed of 1000 m/min, the annealing is done with a voltage of 55 V and a current of 30 A; alloying thermal treating the second wire blank to obtain a finished electrode wire with a diameter of 0.10 mm and having an external shell 3 with a thickness of 3 um, the thermal treatment is carried out at 202° C. for 5 hrs. Finally, the finished product obtained after the thermal treatment is wound onto shafts with different types.

Figure 5:
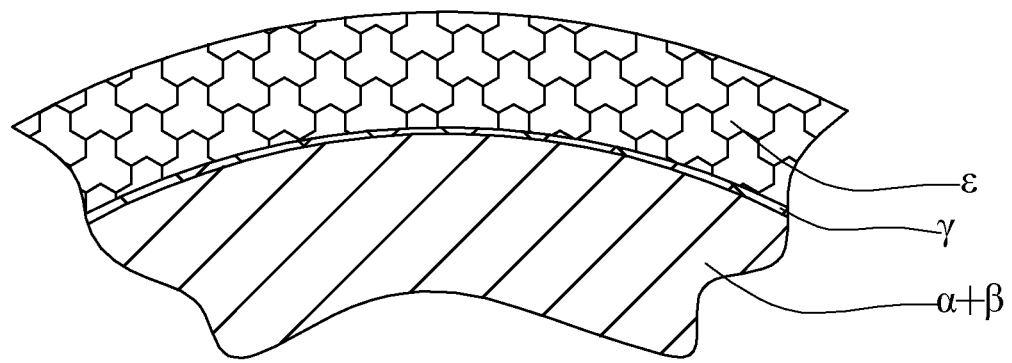

The composition of the external shell 3 of the finished electrode wire in weight percentage (wt %) consists of: 75% Zn, 24.5% Cu, 0.11% Si, 0.06% Ag, 0.15% Ti, 0.015% B and 0.165% impurities. In this embodiment, the material of the mixed alloy has the additional Si, Ag, Ti and B, it will increase the dislocation of Cu—Zn alloy atoms during the stretching of the alloy wire blank when manufacturing, it will result in large distortion of lattices at the grain boundary and the energy will be increased. Accordingly, during the thermal treatment the zinc atoms in η-phase of the external shell 3 are likely to diffusively transfer toward the core 1 ((α+β)-phase), it will benefit for the formation of the ε-phase structure in the external shell 3. During the thermal treatment, the atoms transfer between the external shell 3 and the core 1, accordingly, the defects resulted from the stretching such as atomic dislocation and vacancies are gradually reduced, and the dislocation density is decreased too, the activation energy of diffusion is decreased. In the meanwhile, the melting point of the external shell 3 in ε-phase structure is gradually increased compared to that of the external shell of original pure zinc (the galvanized layer 2) in η-phase, and the bonding force among the atoms is strengthened. Furthermore, it is easy to form a ε-phase structure in the external shell under the thermal treatment of this embodiment. As shown in FIG. 5, the core 1 in the finished electrode wire is in (α+β)-phase, the ε-phase in the metallurgical structure of the external shell 3 reaches 95 wt % and is uniformly distributed on the surface of the core 1, and the remaining in the metallurgical structure of the external shell 3 is in γ-phase.

The elongation rate of the finished electrode wire is tested by a universal electronic stretcher, and the melting point of the shell thereof is tested by a differential thermal analyzer. Using the high-precision zinc-based alloy electrode wire according to this embodiment, the manufacturing precision and the cutting speed of the electrical spark wire cutting machining are tested, material SKD61 as an object material. All the test result data is shown in Table 1.

Embodiment 4

A method for manufacturing a high-precision zinc-based alloy electrode wire, comprises following steps: mixing alloy in proportion by mixing following materials in weight percentage (wt %): 57% Cu, 2.25% Ni, 0.9% Cr, 0.01% Ti, 0.015% Co; and the balance is Zn and unavoidable impurities originated from raw material or introduced during smelting, and the unavoidable impurities is less than or equal to 0.5%; smelting above mixed alloy in an induction furnace, and casting smelted mixed alloy into an alloy wire blank with a diameter of 12 mm; then, obtaining a based wire blank with a diameter of 2 mm by extruding or multi-stage stretching and annealing the alloy wire blank; then, degreasing the based wire blank, washing the based wire blank with acids, washing the based wire blank with water, then galvanizing the based wire blank, with an electroplating current of 2500 A and a voltage of 220 V, to obtain an electroplated first wire blank with a galvanized layer having a thickness of 15 um; next, stretching and annealing the electroplated first wire blank to obtain a second wire blank, the stretching is done with a speed of 1500 m/min, the annealing is done with a voltage of 10 V and a current of 15 A; alloying thermal treating the second wire blank to obtain a finished electrode wire with a diameter of 0.10 mm and having an external shell 3 with a thickness of 3 um, the thermal treatment is carried out at 60° C. for 26 hrs. Finally, the finished product obtained after the thermal treatment is wound onto shafts with different types.

Figure 6:
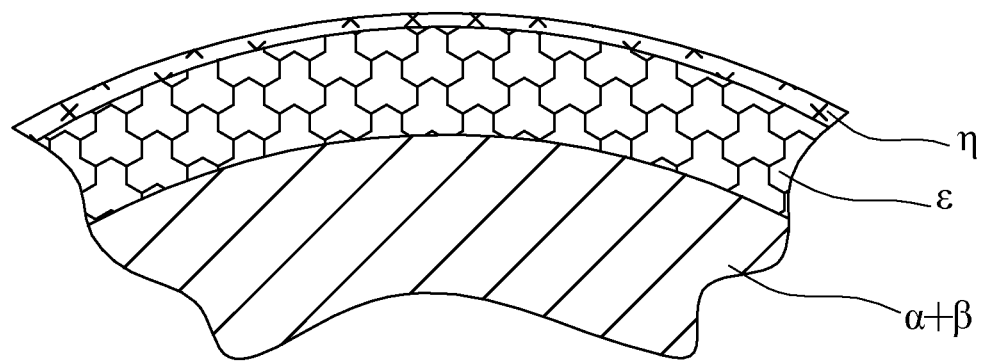
FIG. 6 is a view showing a metallurgical structure of a finished electrode wire according to Embodiments 4, 9 and 10.

The composition of the external shell 3 of the finished electrode wire in weight percentage (wt %) consists of: 90% Zn, 7.5% Cu, 2% Ni, 0.3% Cr, 0.007% Ti, 0.005% Co, and 0.188% impurities. In this embodiment, the material of the mixed alloy has the additional Ni, Cr, Ti and Co, it will increase the dislocation of Cu—Zn alloy atoms during the stretching of the alloy wire blank when manufacturing, it will result in large distortion of lattices at the grain boundary and the energy will be increased. Accordingly, during the thermal treatment the zinc atoms in η-phase of the external shell 3 are likely to diffusively transfer toward the core 1 ((α+β)-phase), it will benefit for the formation of the ε-phase structure in the external shell 3. During the thermal treatment, the atoms transfer between the external shell 3 and the core 1, accordingly, the defects resulted from the stretching such as atomic dislocation and vacancies, are gradually reduced, and the dislocation density is decreased too, the activation energy of diffusion is decreased. In the meanwhile, the melting point of the external shell 3 in ε-phase structure is gradually increased compared to that of the external shell of original pure zinc (the galvanized layer 2) in η-phase, and the bonding force among the atoms is strengthened. Furthermore, it is easy to form a ε-phase structure in the external shell under the thermal treatment of this embodiment. As shown in FIG. 6, the core 1 in the finished electrode wire is in (α+β)-phase, the ε-phase in the metallurgical structure of the external shell 3 reaches 98 wt % and is uniformly distributed on the surface of the core 1, and the remaining in the metallurgical structure of the external shell 3 is in η-phase.

The elongation rate of the finished electrode wire is tested by a universal electronic stretcher, and the melting point of the shell thereof is tested by a differential thermal analyzer. Using the high-precision zinc-based alloy electrode wire according to this embodiment, the manufacturing precision and the cutting speed of the electrical spark wire cutting machining are tested, material SKD61 as an object material. All the test result data is shown in Table 1.

Embodiment 5

A method for manufacturing a high-precision zinc-based alloy electrode wire, comprises following steps: mixing alloy in proportion by mixing following materials in weight percentage (wt %): 60% Cu, 1.8% Ni, 0.1% Si, 0.12% P, 0.07% B; and the balance is Zn and unavoidable impurities originated from raw material or introduced during smelting, and the unavoidable impurities is less than or equal to 0.4%; smelting above mixed alloy in an induction furnace, and casting smelted mixed alloy into an alloy wire blank with a diameter of 15 mm; then, obtaining a based wire blank with a diameter of 1 mm by extruding or multi-stage stretching and annealing the alloy wire blank; then, degreasing the based wire blank, washing the based wire blank with acids, washing the based wire blank with water, then galvanizing the based wire blank, with an electroplating current of 3000 A and a voltage of 220 V, to obtain an electroplated first wire blank with a galvanized layer having a thickness of 10 um; next, stretching and annealing the electroplated first wire blank to obtain a second wire blank, the stretching is done with a speed of 2000 m/min, the annealing is done with a voltage of 40 V and a current of 20 A; alloying thermal treating the second wire blank to obtain a finished electrode wire with a diameter of 0.10 mm and having an external shell 3 with a thickness of 3 um, the thermal treatment is carried out at 83° C. for 19 hrs. Finally, the finished product obtained after the thermal treatment is wound onto shafts with different types.

Figure 7:
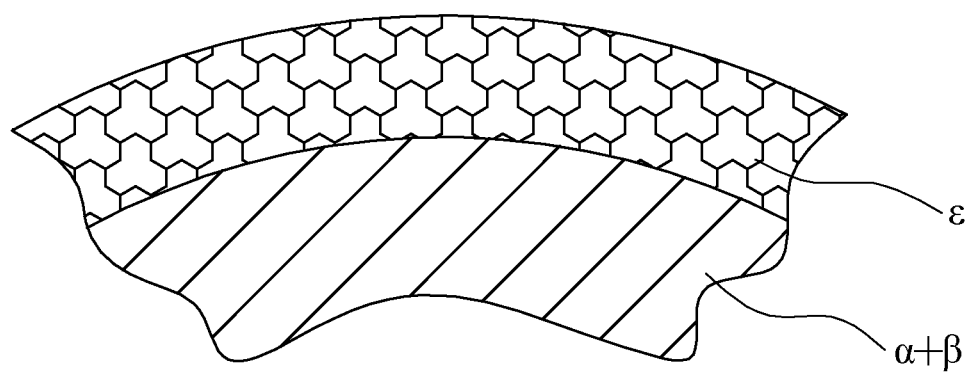
FIG. 7 is a view showing a metallurgical structure of a finished electrode wire according to Embodiments 5, 6, 7, and 8.

The composition of the external shell 3 of the finished electrode wire in weight percentage (wt %) consists of: 82% Zn, 16.4%% Cu, 1.2% Ni, 0.05% Si, 0.07% P, 0.04% B, and 0.24% impurities. In this embodiment, the material of the mixed alloy has the additional Ni, Si, P and B, it will increase the dislocation of Cu—Zn alloy atoms during the stretching of the alloy wire blank when manufacturing, it will result in large distortion of lattices at the grain boundary and the energy will be increased. Accordingly, during the thermal treatment the zinc atoms in η-phase of the external shell 3 are likely to diffusively transfer toward the core 1 ((α+β)-phase), it will benefit for the formation of the ε-phase structure in the external shell 3. During the thermal treatment, the atoms transfer between the external shell 3 and the core 1, accordingly, the defects resulted from the stretching such as atomic dislocation and vacancies, are gradually reduced, and the dislocation density is decreased too, the activation energy of diffusion is decreased. In the meanwhile, the melting point of the external shell 3 in ε-phase structure is gradually increased compared to that of the external shell of original pure zinc (the galvanized layer 2) in η-phase, and the bonding force among the atoms is strengthened. Furthermore, it is easy to form a ε-phase structure in the external shell under the thermal treatment of this embodiment. As shown in FIG. 7, the core 1 in the finished electrode wire is in (α+β)-phase, the ε-phase in the metallurgical structure of the external shell 3 reaches nearly 100 wt % and is uniformly distributed on the surface of the core 1, and there is no other phase in the metallurgical structure of the external shell 3. The expression "the ε-phase in the metallurgical structure of the external shell 3 is nearly 100 wt %" means that, the metallurgical structure of the external shell 3 is wholly in ε-phase, there is no other phase in the metallurgical structure of the external shell 3 except the ε-phase, but the external shell 3 maybe has some oxide or impurities and etc. In the specification of the present invention, the expression "the ε-phase in the metallurgical structure of the external shell 3 is nearly 100 wt %" should be understood in above stated meaning.

The elongation rate of the finished electrode wire is tested by a universal electronic stretcher, and the melting point of the shell thereof is tested by a differential thermal analyzer. Using the high-precision zinc-based alloy electrode wire according to this embodiment, the manufacturing precision and the cutting speed of the electrical spark wire cutting machining are tested, material SKD61 as an object material. All the test result data is shown in Table 1.

Embodiment 6

A method for manufacturing a high-precision zinc-based alloy electrode wire, comprises following steps: mixing alloy in proportion by mixing following materials in weight percentage (wt %): 68% Cu, 0.8% Zr, 0.04% Cr, 0.016% Ti and 0.002% Al; and the balance is Zn and unavoidable impurities originated from raw material or introduced during smelting, and the unavoidable impurities is less than or equal to 0.2%; smelting above mixed alloy in an induction furnace, and casting smelted mixed alloy into an alloy wire blank with a diameter of 11 mm; then, obtaining a based wire blank with a diameter of 5 mm by extruding or multi-stage stretching and annealing the alloy wire blank;

then, degreasing the based wire blank, washing the based wire blank with acids, washing the based wire blank with water, then galvanizing the based wire blank, with an electroplating current of 3000 A and a voltage of 180 V, to obtain an electroplated first wire blank with a galvanized layer having a thickness of 50 um; next, stretching and annealing the electroplated first wire blank to obtain a second wire blank, the stretching is done with a speed of 1500 m/min, the annealing is done with a voltage of 100 V and a current of 10 A; alloying thermal treating the second wire blank to obtain a finished electrode wire with a diameter of 0.10 mm and having an external shell 3 with a thickness of 3.5 um, the thermal treatment is carried out at 163° C. for 8 hrs. Finally, the finished product obtained after the thermal treatment is wound onto shafts with different types.

The composition of the external shell 3 of the finished electrode wire in weight percentage (wt %) consists of: 80% Zn, 19.2% Cu, 0.5% Zr, 0.02% Cr, 0.008% Ti, 0.001% Al and 0.271% impurities. In this embodiment, the material of the mixed alloy has the additional Zr, Cr, Ti and Al, it will increase the dislocation of Cu—Zn alloy atoms during the stretching of the alloy wire blank when manufacturing, it will result in large distortion of lattices at the grain boundary and the energy will be increased. Accordingly, during the thermal treatment the zinc atoms in η-phase of the external shell 3 are likely to diffusively transfer toward the core 1 (($\alpha+\beta$)-phase), it will benefit for the formation of the $\epsilon$-phase structure in the external shell 3. During the thermal treatment, the atoms transfer between the external shell 3 and the core 1, accordingly, the defects resulted from the stretching such as atomic dislocation and vacancies are gradually reduced, and the dislocation density is decreased too, the activation energy of diffusion is decreased. In the meanwhile, the melting point of the external shell 3 in $\epsilon$-phase structure is gradually increased compared to that of the external shell of original pure zinc (the galvanized layer 2) in η-phase, and the bonding force among the atoms is strengthened. Furthermore, it is easy to form a $\epsilon$-phase structure in the external shell under the thermal treatment of this embodiment. As shown in FIG. 7, the core 1 in the finished electrode wire is in ($\alpha+\beta$)-phase, the $\epsilon$-phase in the metallurgical structure of the external shell 3 reaches nearly 100 wt % and is uniformly distributed on the surface of the core 1, and there is no other phase in the metallurgical structure of the external shell 3.

The elongation rate of the finished electrode wire is tested by a universal electronic stretcher, and the melting point of the shell thereof is tested by a differential thermal analyzer. Using the high-precision zinc-based alloy electrode wire according to this embodiment, the manufacturing precision and the cutting speed of the electrical spark wire cutting machining are tested, material SKD61 as an object material. All the test result data is shown in Table 1.

Embodiment 7

A method for manufacturing a high-precision zinc-based alloy electrode wire, comprises following steps: mixing alloy in proportion by mixing following materials in weight percentage (wt %): 65% Cu, 2.25% Ni, 0.015% Si, 0.14% Ti and 0.25% Co; and the balance is Zn and unavoidable impurities originated from raw material or introduced during smelting, and the unavoidable impurities is less than or equal to 0.5%; smelting above mixed alloy in an induction furnace, and casting smelted mixed alloy into an alloy wire blank with a diameter of 13 mm; then, obtaining a based wire blank with a diameter of 3 mm by extruding or multi-stage stretching and annealing the alloy wire blank; then, degreasing the based wire blank, washing the based wire blank with acids, washing the based wire blank with water, then galvanizing the based wire blank, with an electroplating current of 2000 A and a voltage of 200 V, to obtain an electroplated first wire blank with a galvanized layer having a thickness of 30 um; next, stretching and annealing the electroplated first wire blank to obtain a second wire blank, which includes a core 1 and a galvanized layer 2, as shown in FIG. 1, where the stretching is done with a speed of 600 m/min, the annealing is done with a voltage of 20 V and a current of 15 A; alloying thermal treating the second wire blank to obtain a finished electrode wire with a diameter of 0.10 mm and having an external shell 3 with a thickness of 2.5 um, the thermal treatment is carried out at 50° C. for 30 hrs. Finally, the finished product obtained after the thermal treatment is wound onto shafts with different types.

The composition of the external shell 3 of the finished electrode wire in weight percentage (wt %) consists of: 78.5% Zn, 19% Cu, 1.9% Ni, 0.01% Si, 0.12% Ti, 0.2% Co and 0.27% impurities. In this embodiment, the material of the mixed alloy has the additional Ni, Si, Ti and Co, it will increase the dislocation of Cu—Zn alloy atoms during the stretching of the alloy wire blank when manufacturing, it will result in large distortion of lattices at the grain boundary and the energy will be increased. Accordingly, during the thermal treatment the zinc atoms in η-phase of the external shell 3 are likely to diffusively transfer toward the core 1 (($\alpha+\beta$)-phase), it will benefit for the formation of the $\epsilon$-phase structure in the external shell 3. During the thermal treatment, the atoms transfer between the external shell 3 and the core 1, accordingly, the defects resulted from the stretching such as atomic dislocation and vacancies, are gradually reduced, and the dislocation density is decreased too, the activation energy of diffusion is decreased. In the meanwhile, the melting point of the external shell 3 in $\epsilon$-phase structure is gradually increased compared to that of the external shell of original pure zinc (the galvanized layer 2) in η-phase, and the bonding force among the atoms is strengthened. Furthermore, it is easy to form a $\epsilon$-phase structure in the external shell under the thermal treatment of this embodiment. As shown in FIG. 7, the core 1 in the finished electrode wire is in ($\alpha+\beta$)-phase, the $\epsilon$-phase in the metallurgical structure of the external shell 3 reaches nearly 100 wt % and is uniformly distributed on the surface of the core 1, and there is no other phase in the metallurgical structure of the external shell 3.

The elongation rate of the finished electrode wire is tested by a universal electronic stretcher, and the melting point of the shell thereof is tested by a differential thermal analyzer. Using the high-precision zinc-based alloy electrode wire according to this embodiment, the manufacturing precision and the cutting speed of the electrical spark wire cutting machining are tested, material SKD61 as an object material. All the test result data is shown in Table 1.

Embodiment 8

A method for manufacturing a high-precision zinc-based alloy electrode wire, comprises following steps: mixing alloy in proportion by mixing following materials in weight percentage (wt %): 60% Cu, 1.0% Ag, 2.1% Ni, 0.15% Al and 0.09% P; and the balance is Zn and unavoidable impurities originated from raw material or introduced during smelting, and the unavoidable impurities is less than or equal to 0.4%; smelting above mixed alloy in an induction furnace, and casting smelted mixed alloy into an alloy wire blank with a diameter of 15 mm; then, obtaining a based wire blank with a diameter of 2 mm by extruding or multi-stage stretching and annealing the alloy wire blank; then, degreasing the based wire blank, washing the based wire blank with acids, washing the based wire blank with water, then galvanizing the based wire blank, with an electroplating current of 3000 A and a voltage of 220 V, to obtain an electroplated first wire blank with a galvanized layer having a thickness of 25 um; next, stretching and annealing the electroplated first wire blank to obtain a second wire blank, the stretching is done with a speed of 2000 m/min, the annealing is done with a voltage of 40 V and a current of 20 A; alloying thermal treating the second wire blank to obtain a finished electrode wire with a diameter of 0.10 mm and having an external shell 3 with a thickness of 4 um, the thermal treatment is carried out at 230° C. for 3 hrs. Finally, the finished product obtained after the thermal treatment is wound onto shafts with different types.

The composition of the external shell 3 of the finished electrode wire in weight percentage (wt %) consists of: 85% Zn, 12.5% Cu, 0.7% Ag, 1.5% Ni, 0.09% Al, 0.06% P and 0.15% impurities. In this embodiment, the material of the mixed alloy has the additional Ag, Ti, Al and P, it will increase the dislocation of Cu—Zn alloy atoms during the stretching of the alloy wire blank when manufacturing, it will result in large distortion of lattices at the grain boundary and the energy will be increased. Accordingly, during the thermal treatment the zinc atoms in η-phase of the external shell 3 are likely to diffusively transfer toward the core 1 ((α+β)-phase), it will benefit for the formation of the ε-phase structure in the external shell 3. During the thermal treatment, the atoms transfer between the external shell 3 and the core 1, accordingly, the defects resulted from the stretching such as atomic dislocation and vacancies are gradually reduced, and the dislocation density is decreased too, the activation energy of diffusion is decreased. In the meanwhile, the melting point of the external shell 3 in ε-phase structure is gradually increased compared to that of the external shell of original pure zinc (the galvanized layer 2) in η-phase, and the bonding force among the atoms is strengthened. Furthermore, it is easy to form a ε-phase structure in the external shell under the thermal treatment of this embodiment. As shown in FIG. 7, the core 1 in the finished electrode wire is in (α+β)-phase, the ε-phase in the metallurgical structure of the external shell 3 reaches nearly 100 wt % and is uniformly distributed on the surface of the core 1, and there is no other phase in the metallurgical structure of the external shell 3.

The elongation rate of the finished electrode wire is tested by a universal electronic stretcher, and the melting point of the shell thereof is tested by a differential thermal analyzer. Using the high-precision zinc-based alloy electrode wire according to this embodiment, the manufacturing precision and the cutting speed of the electrical spark wire cutting machining are tested, material SKD61 as an object material. All the test result data is shown in Table 1.

Embodiment 9

A method for manufacturing a high-precision zinc-based alloy electrode wire, comprises following steps: mixing alloy in proportion by mixing following materials in weight percentage (wt %): 64% Cu, 0.02% Zr, 1.3% Si, 0.15% P and 0.05% Co; and the balance is Zn and unavoidable impurities originated from raw material or introduced during smelting, and the unavoidable impurities is less than or equal to 0.5%; smelting above mixed alloy in an induction furnace, and casting smelted mixed alloy into an alloy wire blank with a diameter of 12 mm; then, obtaining a based wire blank with a diameter of 1.5 mm by extruding or multi-stage stretching and annealing the alloy wire blank; then, degreasing the based wire blank, washing the based wire blank with acids, washing the based wire blank with water, then galvanizing the based wire blank, with an electroplating current of 2500 A and a voltage of 220 V, to obtain an electroplated first wire blank with a galvanized layer having a thickness of 15 um; next, stretching and annealing the electroplated first wire blank to obtain a second wire blank, the stretching is done with a speed of 1500 m/min, the annealing is done with a voltage of 10 V and a current of 15 A; alloying thermal treating the second wire blank to obtain a finished electrode wire with a diameter of 0.10 mm and having an external shell 3 with a thickness of 3 um, the thermal treatment is carried out at 140° C. for 16 hrs. Finally, the finished product obtained after the thermal treatment is wound onto shafts with different types.

The composition of the external shell 3 of the finished electrode wire in weight percentage (wt %) consists of: 89% Zn, 10.1% Cu, 0.012% Zr, 0.8% Si, 0.05% P, 0.02% Co and 0.018% impurities. In this embodiment, the material of the mixed alloy has the additional Zr, Si, P and Co, it will increase the dislocation of Cu—Zn alloy atoms during the stretching of the alloy wire blank when manufacturing, it will result in large distortion of lattices at the grain boundary and the energy will be increased. Accordingly, during the thermal treatment the zinc atoms in η-phase of the external shell 3 are likely to diffusively transfer toward the core 1 ((α+β)-phase), it will benefit for the formation of the ε-phase structure in the external shell 3. During the thermal treatment, the atoms transfer between the external shell 3 and the core 1, accordingly, the defects resulted from the stretching such as atomic dislocation and vacancies are gradually reduced, and the dislocation density is decreased too, the activation energy of diffusion is decreased. In the meanwhile, the melting point of the external shell 3 in ε-phase structure is gradually increased compared to that of the external shell of original pure zinc (the galvanized layer 2) in η-phase, and the bonding force among the atoms is strengthened. Furthermore, it is easy to form a ε-phase structure in the external shell under the thermal treatment of this embodiment. As shown in FIG. 6, the core 1 in the finished electrode wire is in (α+β)-phase, the ε-phase in the metallurgical structure of the external shell 3 reaches 97 wt % and is uniformly distributed on the surface of the core 1, and the remaining in the metallurgical structure of the external shell 3 is in η-phase.

The elongation rate of the finished electrode wire is tested by a universal electronic stretcher, and the melting point of the shell thereof is tested by a differential thermal analyzer. Using the high-precision zinc-based alloy electrode wire according to this embodiment, the manufacturing precision and the cutting speed of the electrical spark wire cutting machining are tested, material SKD61 as an object material. All the test result data is shown in Table 1.

Embodiment 10

A method for manufacturing a high-precision zinc-based alloy electrode wire, comprises following steps: mixing alloy in proportion by mixing following materials in weight percentage (wt %): 68% Cu, 0.8% Zr, 0.05% Ag, 0.08% B and 0.03% Co; and the balance is Zn and unavoidable impurities originated from raw material or introduced during smelting, and the unavoidable impurities is less than or equal to 0.2%; smelting above mixed alloy in an induction furnace, and casting smelted mixed alloy into an alloy wire blank with a diameter of 11 mm; then, obtaining a based wire blank with a diameter of 5 mm by extruding or multi-stage stretching and annealing the alloy wire blank; then, degreasing the based wire blank, washing the based wire blank with acids, washing the based wire blank with water, then galvanizing the based wire blank, with an electroplating current of 3000 A and a voltage of 180 V, to obtain an electroplated first wire blank with a galvanized layer having a thickness of 45 um; next, stretching and annealing the electroplated first wire blank to obtain a second wire blank, the stretching is done with a speed of 1500 m/min, the annealing is done with a voltage of 100 V and a current of 10 A; alloying thermal treating the second wire blank to obtain a finished electrode wire with a diameter of 0.10 mm and having an external shell 3 with a thickness of 4 um, the thermal treatment is carried out at 80° C. for 25 hrs. Finally, the finished product obtained after the thermal treatment is wound onto shafts with different types.

The composition of the external shell 3 of the finished electrode wire in weight percentage (wt %) consists of: 87% Zn, 12.2% Cu, 0.5% Zr, 0.03% Ag, 0.03% B, 0.01% Co and 0.23% impurities. In this embodiment, the material of the mixed alloy has the additional Zr, Ag, B and Co, it will increase the dislocation of Cu—Zn alloy atoms during the stretching of the alloy wire blank when manufacturing, it will result in large distortion of lattices at the grain boundary and the energy will be increased. Accordingly, during the thermal treatment the zinc atoms in η-phase of the external shell 3 are likely to diffusively transfer toward the core 1 (($\alpha+\beta$)-phase), it will benefit for the formation of the ε-phase structure in the external shell 3. During the thermal treatment, the atoms transfer between the external shell 3 and the core 1, accordingly, the defects resulted from the stretching such as atomic dislocation and vacancies are gradually reduced, and the dislocation density is decreased too, the activation energy of diffusion is decreased. In the meanwhile, the melting point of the external shell 3 in ε-phase structure is gradually increased compared to that of the external shell of original pure zinc (the galvanized layer 2) in η-phase, and the bonding force among the atoms is strengthened. Furthermore, it is easy to form a ε-phase structure in the external shell under the thermal treatment of this embodiment. As shown in FIG. 6, the core 1 in the finished electrode wire is in ($\alpha+\beta$)-phase, the ε-phase in the metallurgical structure of the external shell 3 reaches 99 wt % and is uniformly distributed on the surface of the core 1, and the remaining in the metallurgical structure of the external shell 3 is in η-phase.

The elongation rate of the finished electrode wire is tested by a universal electronic stretcher, and the melting point of the shell thereof is tested by a differential thermal analyzer. Using the high-precision zinc-based alloy electrode wire according to this embodiment, the manufacturing precision and the cutting speed of the electrical spark wire cutting machining are tested, material SKD61 as an object material. All the test result data is shown in Table 1.

Comparative Example 1

Figure 8:
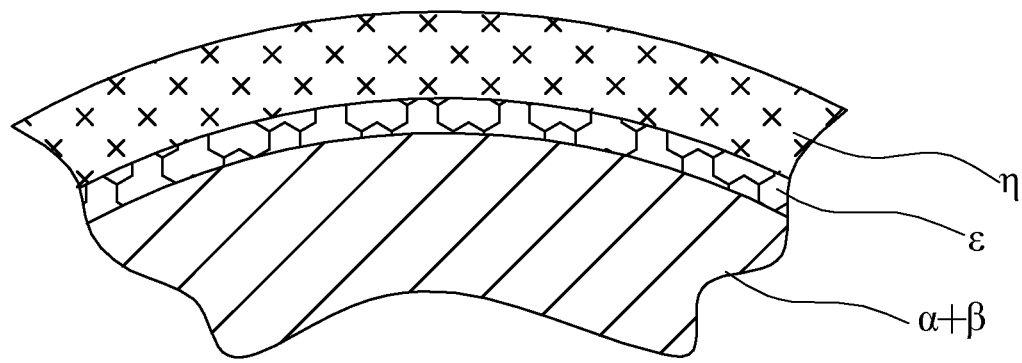
FIG. 8 to FIG. 11 are views showing a metallurgical structure of a finished electrode wire according to Comparative Examples 1 to 4.

A method for manufacturing a high-precision zinc-based alloy electrode wire, comprises following steps: mixing alloy in proportion by mixing following materials in weight percentage (wt %): 66% Cu, and the balance is Zn and unavoidable impurities originated from raw material or introduced during smelting, and the unavoidable impurities is less than or equal to 0.3%; smelting above mixed alloy in an induction furnace, and casting smelted mixed alloy into an alloy wire blank with a diameter of 8 mm; then, obtaining a based wire blank with a diameter of 3 mm by extruding or multi-stage stretching and annealing the alloy wire blank; then, degreasing the based wire blank, washing the based wire blank with acids, washing the based wire blank with water, then galvanizing the based wire blank, with an electroplating current of 1500 A and a voltage of 200 V, to obtain an electroplated first wire blank with a galvanized layer having a thickness of 40 um; next, stretching and annealing the electroplated first wire blank to obtain a second wire blank, the stretching is done with a speed of 500 m/min, the annealing is done with a voltage of 80 V and a current of 50 A; alloying thermal treating the second wire blank to obtain a finished electrode wire with a diameter of 0.10 mm and having an external shell with a thickness of 4 um, the thermal treatment is carried out at 208° C. for 72 hrs. Finally, the finished product obtained after the thermal treatment is wound onto shafts with different types. The composition of the external shell of the finished electrode wire in weight percentage (wt %) consists of: 92.1% Zn, 7.6% Cu and 0.3% impurities. As shown in FIG. 8, the ε-phase in the metallurgical structure of the external shell is 8 wt %, and the remaining in the metallurgical structure of the external shell is in η-phase.

The elongation rate of the finished electrode wire is tested by a universal electronic stretcher, and the melting point of the shell thereof is tested by a differential thermal analyzer. Using the electrode wire according to the comparative example 1, the manufacturing precision and the cutting speed of the electrical spark wire cutting machining are tested, material SKD61 as an object material. All the test result data is shown in Table 1.

Comparative Example 2

Figure 9:
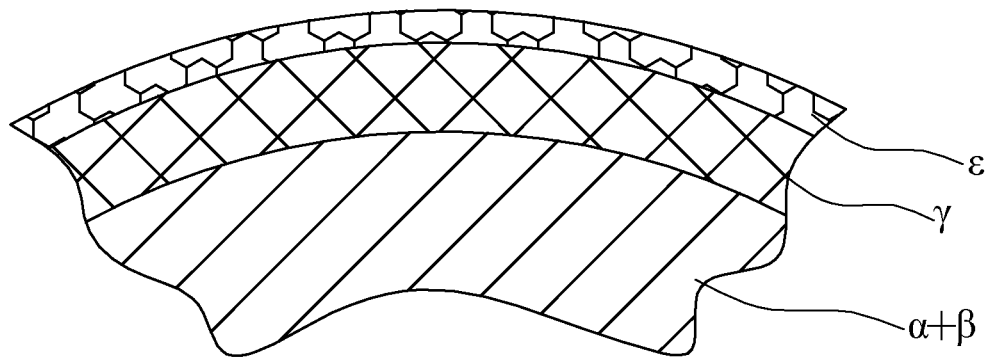

A method for manufacturing a high-precision zinc-based alloy electrode wire, comprises following steps: mixing alloy in proportion by mixing following materials in weight percentage (wt %): 60% Cu, and the balance is Zn and unavoidable impurities originated from raw material or introduced during smelting, and the unavoidable impurities is less than or equal to 0.4%; smelting above mixed alloy in an induction furnace, and casting smelted mixed alloy into an alloy wire blank with a diameter of 15 mm; then, obtaining a based wire blank with a diameter of 1 mm by extruding or multi-stage stretching and annealing the alloy wire blank; then, degreasing the based wire blank, washing the based wire blank with acids, washing the based wire blank with water, then galvanizing the based wire blank, with an electroplating current of 3000 A and a voltage of 220 V, to obtain an electroplated first wire blank with a galvanized layer having a thickness of 10 um; next, stretching and annealing the electroplated first wire blank to obtain a second wire blank, the stretching is done with a speed of 2000 m/min, the annealing is done with a voltage of 40 V and a current of 20 A; alloying thermal treating the second wire blank to obtain a finished electrode wire with a diameter of 0.10 mm and having an external shell with a thickness of 4 um, the thermal treatment is carried out at 105° C. for 100 hrs. Finally, the finished product obtained after the thermal treatment is wound onto shafts with different types. The composition of the external shell of the finished electrode wire in weight percentage (wt %) consists of: 65.2% Zn, 34.62% Cu and 0.18% impurities. As shown in FIG. 9, the ϵ-phase in the metallurgical structure of the external shell is 10 wt %, and the remaining in the metallurgical structure of the external shell is in γ-phase.

The elongation rate of the finished electrode wire is tested by a universal electronic stretcher, and the melting point of the shell thereof is tested by a differential thermal analyzer. Using the electrode wire according to the comparative example 2, the manufacturing precision and the cutting speed of the electrical spark wire cutting machining are tested, material SKD61 as an object material. All the test result data is shown in Table 1.

Comparative Example 3

Figure 10:
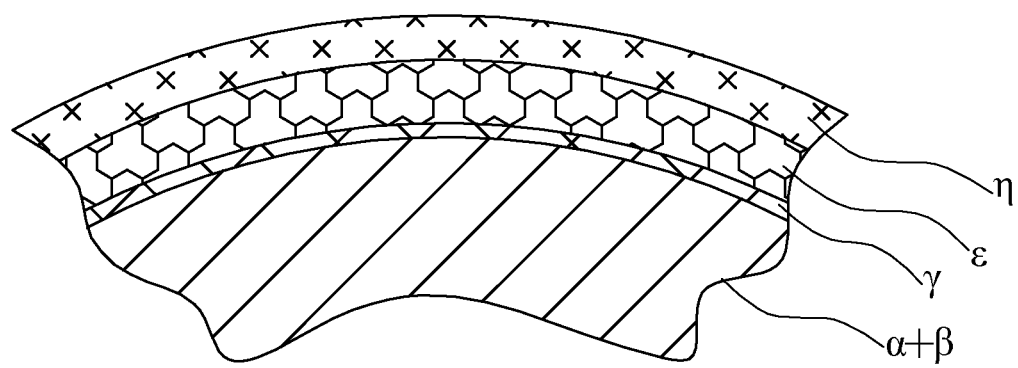

A method for manufacturing a high-precision zinc-based alloy electrode wire, comprises following steps: mixing alloy in proportion by mixing following materials in weight percentage (wt %): 60% Cu, 1.5% Ag, 0.02% Ni and the balance is Zn and unavoidable impurities originated from raw material or introduced during smelting, and the unavoidable impurities is less than or equal to 0.3%; smelting above mixed alloy in an induction furnace, and casting smelted mixed alloy into an alloy wire blank with a diameter of 8 mm; then, obtaining a based wire blank with a diameter of 1 mm by extruding or multi-stage stretching and annealing the alloy wire blank; then, degreasing the based wire blank, washing the based wire blank with acids, washing the based wire blank with water, then galvanizing the based wire blank, with an electroplating current of 1600 A and a voltage of 200 V, to obtain an electroplated first wire blank with a galvanized layer having a thickness of 15 um; next, stretching and annealing the electroplated first wire blank to obtain a second wire blank, the stretching is done with a speed of 1000 m/min, the annealing is done with a voltage of 50 V and a current of 25 A; alloying thermal treating the second wire blank to obtain a finished electrode wire with a diameter of 0.10 mm and having an external shell with a thickness of 3.5 um, the thermal treatment is carried out at 190° C. for 60 hrs. Finally, the finished product obtained after the thermal treatment is wound onto shafts with different types. The composition of the external shell of the finished electrode wire in weight percentage (wt %) consists of: 82.1% Zn, 16.92% Cu, 0.6% Ag, 0.009% Ni and 0.371% impurities. As shown in FIG. 10, the ϵ-phase in the metallurgical structure of the external shell is 60 wt %, and the remaining in the metallurgical structure of the external shell is in γ-phase and η-phase.

The elongation rate of the finished electrode wire is tested by a universal electronic stretcher, and the melting point of the shell thereof is tested by a differential thermal analyzer. Using the electrode wire according to the comparative example 3, the manufacturing precision and the cutting speed of the electrical spark wire cutting machining are tested, material SKD61 as an object material. All the test result data is shown in Table 1.

Comparative Example 4

Figure 11:
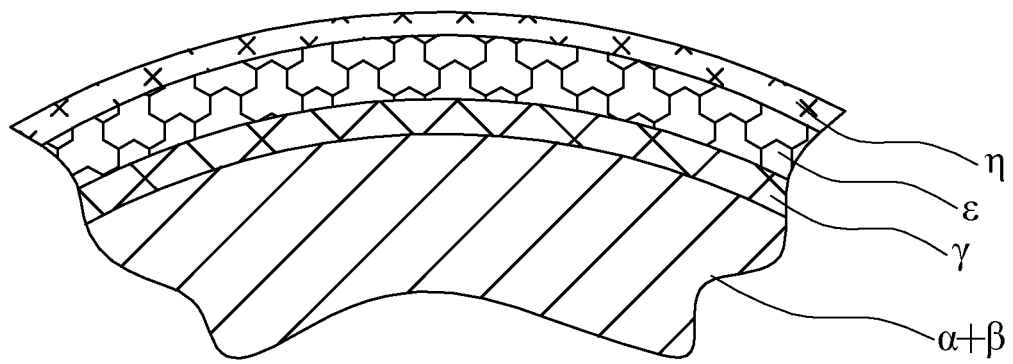

A method for manufacturing a high-precision zinc-based alloy electrode wire, comprises following steps: mixing alloy in proportion by mixing following materials in weight percentage (wt %): 58% Cu, 0.15% Ti, 0.004% Co and the balance is Zn and unavoidable impurities originated from raw material or introduced during smelting, and the unavoidable impurities is less than or equal to 0.3%; smelting above mixed alloy in an induction furnace, and casting smelted mixed alloy into an alloy wire blank with a diameter of 10 mm; then, obtaining a based wire blank with a diameter of 1 mm by extruding or multi-stage stretching and annealing the alloy wire blank; then, degreasing the based wire blank, washing the based wire blank with acids, washing the based wire blank with water, then galvanizing the based wire blank, with an electroplating current of 1700 A and a voltage of 210 V, to obtain an electroplated first wire blank with a galvanized layer having a thickness of 12 um; next, stretching and annealing the electroplated first wire blank to obtain a second wire blank, the stretching is done with a speed of 600 m/min, the annealing is done with a voltage of 10 V and a current of 5 A; alloying thermal treating the second wire blank to obtain a finished electrode wire with a diameter of 0.10 mm and having an external shell with a thickness of 3 um, the thermal treatment is carried out at 135° C. for 56 hrs. Finally, the finished product obtained after the thermal treatment is wound onto shafts with different types. The composition of the external shell of the finished electrode wire in weight percentage (wt %) consists of: 80.3% Zn, 19.448% Cu, 0.06% Ti, 0.002% Co and 0.19% impurities. As shown in FIG. 11, the ϵ-phase in the metallurgical structure of the external shell is 58 wt %, and the remaining in the metallurgical structure of the external shell is in γ-phase and η-phase.

The elongation rate of the finished electrode wire is tested by a universal electronic stretcher, and the melting point of the shell thereof is tested by a differential thermal analyzer. Using the electrode wire according to the comparative example 4, the manufacturing precision and the cutting speed of the electrical spark wire cutting machining are tested, material SKD61 as an object material. All the test result data is shown in Table 1.

Comparative Example 5

A galvanized electrode wire includes a core composed of Cu—Zn alloy with a diameter of 0.5-5 mm, the core contains 63% Cu and unavoidable impurities, and the unavoidable impurities is less than or equal to 0.3%. When manufacturing, the core is galvanized directly to obtain a galvanized layer having a thickness of 20 um; then, stretching and annealing the electroplated core to obtain a galvanized electrode wire with a diameter of 0.05-0.35 mm, and the external shell has a metallurgical structure in η-phase.

The elongation rate of the finished electrode wire is tested by a universal electronic stretcher, and the melting point of the shell thereof is tested by a differential thermal analyzer. Using the electrode wire according to the comparative example 5, the manufacturing precision and the cutting speed of the electrical spark wire cutting machining are tested, material SKD61 as an object material. All the test result data is shown in Table 1.

Comparative Example 6

A brass electrode wire has a wire blank composed of Cu—Zn alloy with a diameter of 0.5-5 mm, the wire blank contains 63% Cu and unavoidable impurities, and the unavoidable impurities is less than or equal to 0.3%. When manufacturing, directly stretching and annealing the wire blank to obtain a brass electrode wire with a diameter of 0.05-0.35 mm, and the external shell has a metallurgical structure in (α+β)-phase.

The elongation rate of the finished electrode wire is tested by a universal electronic stretcher, and the melting point of the shell thereof is tested by a differential thermal analyzer. Using the brass electrode wire according to the comparative example 6, the manufacturing precision and the cutting speed of the electrical spark wire cutting machining are tested, material SKD61 as an object material. All the test result data is shown in Table 1.

Comparative Example 7

A high-speed electrode wire has a core composed of red copper with a diameter of 0.5-5 mm. When manufacturing, directly galvanizing the surface of the core to obtain a first wire blank with a galvanized layer having a thickness of 50 um; thermal treating the first wire blank to obtain a second wire blank, the thermal treatment is carried out at 550° C. for 10 hrs; stretching and annealing the second wire blank to obtain a high-speed electrode wire with a diameter of 0.05-0.35 mm, and the external shell has a metallurgical structure in β-phase.

The elongation rate of the finished electrode wire is tested by a universal electronic stretcher, and the melting point of the shell thereof is tested by a differential thermal analyzer. Using the high-speed electrode wire according to comparative example 7, the manufacturing precision and the cutting speed of the electrical spark wire cutting machining are tested, material SKD61 as an object material. All the test result data is shown in Table 1.

Comparative Example 8

A coated electrode wire has a core composed of Cu—Zn alloy with a diameter of 0.5-5 mm. The components of this core are the same as that of the finished electrode wire in Embodiment 1. When manufacturing, directly galvanizing the core to obtain a first wire blank with a galvanized layer having a thickness of 30 um; thermal treating the first wire blank to obtain a second wire blank, the thermal treatment is carried out at 450° C. for 6 hrs; then stretching and annealing the second wire blank to obtain a coated electrode wire with a diameter of 0.05-0.35 mm, and the external shell has a metallurgical structure in γ-phase.

The elongation rate of the finished electrode wire is tested by a universal electronic stretcher, and the melting point of the shell thereof is tested by a differential thermal analyzer. Using the coated electrode wire according to the comparative example 8, the manufacturing precision and the cutting speed of the electrical spark wire cutting machining are tested, material SKD61 as an object material. All the test result data is shown in Table 1.

Comparative Example 9

A composite electrode wire has a core composed of Cu—Zn alloy with a diameter of 0.5-5 mm. The components of this core are the same as that of the finished electrode wire in Embodiment 3. When manufacturing, directly galvanizing the core to obtain a first wire blank with a galvanized layer having a thickness of 40 um; thermal treating the first wire blank to obtain a second wire blank, the thermal treatment is carried out at 600° C. for 12 hrs; stretching and annealing the second wire blank, and once again electroplating the second wire blank with brass in γ-phase, and after the thermal treatment, repeatedly stretching and annealing the second wire blank to obtain the finished composite electrode wire with a diameter of 0.05-0.35 mm, and the external shell has a metallurgical structure in (β+γ)-phase.

The elongation rate of the finished electrode wire is tested by a universal electronic stretcher, and the melting point of the shell thereof is tested by a differential thermal analyzer. Using the composite electrode wire according to the comparative example 9, the manufacturing precision and the cutting speed of the electrical spark wire cutting machining are tested, material SKD61 as an object material. All the test result data is shown in Table 1.

Table 1 shows the metallurgical structure of the external shell, the manufacturing precision ratio and the cutting speed of the electrical spark wire cutting machining the elongation rate and the melting point of electrode wires in the embodiments and comparative examples.

TABLE 1

|  | No. | the metallurgical structure of the external shell | manufacturing precision ratio | Cutting speed (mm/min) | elongation rate (%) | melting point (° C.) |
|---|---|---|---|---|---|---|
| Embodiment | 1 | ε: about 86% Remaining: γ | 1.12 | 3.26 | 2.5 | 688 |
|  | 2 | ε: about 92% Remaining: η | 1.15 | 3.23 | 3 | 603 |
|  | 3 | ε: about 95% or more Remaining: γ | 1.16 | 3.20 | 2.5 | 673 |
|  | 4 | ε: about 98% or more Remaining: η | 1.19 | 3.18 | 3 | 621 |
|  | 5 | ε: about 100% Remaining: no | 1.20 | 3.17 | 4 | 638 |
|  | 6 | ε: about 100% Remaining: no | 1.21 | 3.16 | 4 | 647 |
|  | 7 | ε: about 100% Remaining: no | 1.22 | 3.15 | 4.5 | 651 |
|  | 8 | ε: about 100% Remaining: no | 1.20 | 3.16 | 3.5 | 658 |
|  | 9 | ε: about 97% or more Remaining: η | 1.18 | 3.18 | 3 | 619 |
|  | 10 | ε: about 99% or more | 1.21 | 3.17 | 3.5 | 627 |

TABLE 1-continued

|  | No. | the metallurgical structure of the external shell | manufacturing precision ratio | Cutting speed (mm/min) | elongation rate (%) | melting point (° C.) |
|---|---|---|---|---|---|---|
| Comparative Example | 1 | Remaining: η ε: about 8% or less | 1.01 | 3.02 | 1.5 | 437 |
|  | 2 | Remaining: η ε: about 10% or less | 0.97 | 3.38 | 1 | 703 |
|  | 3 | Remaining: γ ε: about 60% | 1.08 | 3.30 | 2.5 | 586 |
|  | 4 | Remaining: γ and η ε: about 58% | 1.07 | 3.34 | 2 | 715 |
|  | 5 | Remaining: η and γ η | 1.0 | 3.0 | 2 | 419.5 |
|  | 6 | α + β | 0.93 | 2.82 | 1.5 | 903 |
|  | 7 | β | 0.91 | 3.67 | 1.5 | 875 |
|  | 8 | γ | 0.96 | 3.43 | 0.5 | 798 |
|  | 9 | β + γ | 0.94 | 3.56 | 1 | 835 |

Note: All data in Table 1 are obtained under the same conditions, where, the diameter of the electrode wire is 0.10 mm. Of course, it is possible for those skilled in the art to effectively regulate the condition for annealing while stretching to the first wire blank and the condition for thermal treatment to the second wire blank in various embodiments, so that the diameter of the finished electrode wire in the above embodiments varies from 0.05 mm to 0.35 mm.

The manufacturing precision ratio is the result regarding the manufacturing precision of Comparative Example 5 as a base. That is, the date (the value) of the manufacturing precision ratio in Table 1, is just ratio of the manufacturing precision of Embodiments 1-10 and Comparative Example 1, 2, 3, 4, 6, 7, 8, 9 respectively to that of Comparative Example 5.

In conclusion, the high-precision Zn-based alloy electrode wire of the present invention has a significantly superior manufacturing precision in electrical spark wire cutting machining, and a cutting speed up to that of similar products, a good elongation capability and a higher melting point.

The foregoing embodiments are provided for illustrating the present invention, instead of limiting the present invention. Any modifications and variations done within the spirit and scope of the present invention defined by the claims shall be regarded as falling into the protection scope of the present invention.

The invention claimed is:

1. A high-precision zinc-based alloy electrode wire, comprising:
   a core; and
   an external shell covering the core;
   wherein
   the core is made of brass,
   the external shell is made from a material, the material's composition in weight percentage (wt %) consisting of:
   Zn: 70.5-95%; Cu: 2.5-27%; X: 0.02-4.0%; Y: 0.002-0.4%; and unavoidable impurities, and the unavoidable impurities is less than or equal to 0.3%;
   where, X refers to any two kinds of metals selected from Ni, Ag, Cr, Si and Zr, and the weight percentage of each of these two kinds of metals is 0.01-2.0%; and Y refers to any two kinds of metals selected from Ti, Al, Co, B, and P, and the weight percentage of each of these two kinds of metals is 0.001-0.2%;
   the external shell has a thickness of 2-4 μm, the weight percentage of ε-phase in a metallurgical structure of the external shell is above 80 wt %, and a remainder component of the external shell is either γ-phase or η-phase; and the ε-phase is uniformly distributed on a surface of the core.

2. The alloy electrode wire of claim 1, wherein the combined amount of X and Y is more than 0.5 wt %.

3. The alloy electrode wire of claim 1, wherein the combined amount of X and Y is at least 1%.

4. The alloy electrode wire of claim 1, wherein the bass core is in (α+β) phase.

5. A high-precision zinc-based alloy electrode wire comprising:
   a core; and
   an external shell covering the core;
   wherein
   the core is made of brass,
   the external shell in wt % consisting of:
   Zn: 78.5-85%; Cu: 12.5-19%; X: 0.02-4.0%; Y: 0.002-0.4%; and unavoidable impurities, and the unavoidable impurities is less than or equal to 0.3%;
   where, X refers to any two kinds of metals selected from Ni, Ag, Cr, Si and Zr, and the weight percentage of each of these two kinds of metals is 0.01-2.0%; and Y refers to any two kinds of metals selected from Ti, Al, Co, B, and P, and the weight percentage of each of these two kinds of metals is 0.001-0.2%;
   the external shell has a thickness of 2-4 μm, the external shell has a metallurgical structure in ε-phase, and the ε-phase is uniformly distributed on a surface of the core.

6. The alloy electrode wire of claim 5, wherein the combined amount of X and Y is more than 0.5 wt %.

7. The alloy electrode wire of claim 5, wherein the combined amount of X and Y is at least 1%.

8. The alloy electrode wire of claim 5, wherein the bass core is in (α+β) phase.

9. A method for manufacturing a high-precision zinc-based alloy electrode wire, comprising following steps:
   1) mixing alloy in proportion by mixing, in weight percentage (wt %): 57-68% Cu, 0.03-4.5% X, 0.004-

0.5% Y; and the balance is Zn and unavoidable impurities originated from raw material or introduced during smelting, and the unavoidable impurities is less than or equal to 0.5%;

where X refers to any two kinds of metals selected from Ni, Ag, Cr, Si, and Zr, and each of these two kinds of metals is 0.015-2.25%; and Y refers to any two kinds of metals selected from Ti, Al, Co, B, and P, and each of these two kinds of metals is 0.002-0.25%;

2) smelting mixed alloy in an induction furnace, and casting smelted mixed alloy into an alloy wire blank with a diameter of 8-15 mm;

3) obtaining a based wire blank with a diameter of 0.5-5 mm by extruding or multi-stage stretching and annealing the alloy wire blank;

4) degreasing the based wire blank, waShing the based wire blank with acids, waShing the based wire blank with water, then galvanizing the based wire blank, with an electroplating current of 1500-3000 A and a voltage of 150-220 V, to obtain an electroplated first wire blank with a galvanized layer having a thickness of 0.5-50 μm;

5) stretching and annealing the electroplated first wire blank to obtain a second wire blank; and 6) alloying thermal treating the second wire blank to obtain a finished electrode wire with a diameter of 0.05-0.35 mm.

10. The method of claim 9, wherein in Step 5, the stretching is done with a speed of 500-2000 m/min, the annealing is done with a voltage between 10-100 V and a current between 10-50 A.

11. The method of claim 9, wherein in Step 6, the thermal treatment is carried out at 50-230 degrees C. for 3-30 hrs.

12. The method of claim 9, wherein the combined amount of X and Y is more than 0.5 wt %.

13. The method of claim 9, wherein the combined amount of X and Y is at least 1%.

14. The method of claim 9, wherein the bass core is in $(\alpha+\beta)$ phase.

* * * * *